United States Patent [19]

Peiffer et al.

[11] Patent Number: 5,489,454
[45] Date of Patent: Feb. 6, 1996

[54] MATTE, HEAT-SEALABLE, SHRINKABLE, BIAXIALLY ORIENTED, MULTILAYER POLYPROPYLENE FILM, PROCESS FOR THE PRODUCTION THEREOF, AND THE USE THEREOF

[75] Inventors: Herbert Peiffer, Mainz; Ursula Murschall, Nierstein, both of Germany

[73] Assignee: Hoechst Aktiengesellschaft, Frankfurt, Germany

[21] Appl. No.: 229,219

[22] Filed: Apr. 18, 1994

[30] Foreign Application Priority Data

Apr. 27, 1993 [DE] Germany .......................... 43 13 431.9

[51] Int. Cl.⁶ ..................................... B65B 53/00
[52] U.S. Cl. .................. 428/34.9; 428/35.7; 428/349; 428/516
[58] Field of Search ................................ 428/516, 349, 428/34.9, 35.7

[56] References Cited

U.S. PATENT DOCUMENTS

| | | | |
|---|---|---|---|
| 3,619,195 | 11/1971 | Van Campen | 96/100 |
| 4,297,415 | 10/1981 | Ward et al. | 428/516 |
| 4,419,411 | 12/1983 | Park | 428/516 |
| 4,578,316 | 3/1986 | Clauson et al. | 428/516 |
| 4,597,920 | 7/1986 | Golike | 264/22 |
| 4,622,237 | 11/1986 | Lori | 427/40 |
| 4,698,261 | 10/1987 | Bothe . | |
| 4,734,317 | 3/1988 | Bothe et al. | 428/215 |
| 4,855,187 | 8/1989 | Osgood, Jr. et al. | 428/516 |
| 4,960,637 | 10/1990 | Biczenczuk | 428/314.4 |
| 5,051,481 | 9/1991 | Taka et al. | 525/240 |
| 5,254,393 | 10/1993 | Murschall et al. | 428/212 |

FOREIGN PATENT DOCUMENTS

| | | |
|---|---|---|
| 0236945 | 9/1987 | European Pat. Off. . |
| 0436196 | 7/1991 | European Pat. Off. . |
| 0489373 | 6/1992 | European Pat. Off. . |
| 4135096 | 4/1993 | Germany . |
| 2201407 | 9/1988 | United Kingdom . |

OTHER PUBLICATIONS

Derwent Publications Ltd., AN 91–298804 (abstract of JP–A–3 197 541 published Aug. 28, 1991).

Patent Abstracts of Japan, vol. 16, No. 306 (M–1276) Jul. 6, 1992, (abstract of JP–A–04 086 260 published Mar. 18, 1992).

Primary Examiner—Edith Buffalow
Attorney, Agent, or Firm—Foley & Lardner

[57] ABSTRACT

The invention relates to a heat-sealable, shrinkable multilayer polypropylene film which includes at least one base layer containing polypropylene or a polypropylene mixture and at least one outer layer which contains a mixture or a blend of two components I and II. The mixture contains copolymers and terpolymers of α-olefins having 2 to 10 carbon atoms and HDPE. The film has a longitudinal shrinkage of >8% at 120° C. and ≦10% at 90° C. The film has a transverse shrinkage of >10% at 120° C. and ≦10% at 90° C. The film has a minimum heat-sealing temperature of ≦124° C. The film is matte.

16 Claims, No Drawings

MATTE, HEAT-SEALABLE, SHRINKABLE, BIAXIALLY ORIENTED, MULTILAYER POLYPROPYLENE FILM, PROCESS FOR THE PRODUCTION THEREOF, AND THE USE THEREOF

BACKGROUND OF THE INVENTION

1. Field of the Invention

The invention relates to a heat-sealable, shrinkable, multilayer polypropylene film which comprises at least one base layer containing a propylene polymer or a propylene polymer mixture and at least one outer layer which comprises a mixture or a blend of two polymer components.

The film according to the invention is distinguished by a characteristic matte surface or appearance and high shrinkage in the longitudinal and transverse directions.

The invention further relates to a process for the production of the multilayer film and to the use of the film.

2. Description of Related Art

Shrink films are known in the art and are widely used as packaging films.

Shrink packaging is usually produced starting from a pouch, into which the good are introduced, followed by separation/welding and subsequent shrinkage in a shrink oven. In this way, very tight, fold-free film packaging is obtained, as is particularly desirable in many cases. In order for a tight wrap to be reliably achieved, the films used must have very high shrinkage values, because the film after separation/welding surrounds the contents relatively loosely. This is due to the fact that the welding wire cannot be moved right up against the packaged goods. High shrinkage values of the films are therefore a prerequisite for their use as conventional shrink packaging. Such films are described, for example, in EP-A-0 436 196, DE-A-19 54 467, DE-A-32 15 120 and EP-A-0 350 859.

Heat-sealable films are likewise widespread and generally known as packaging materials. The heat-sealability of the material enables the packaging of products on high-speed packaging machines, which allows considerable economic advantages to be achieved.

Heat-sealable, biaxially oriented, multilayer polyolefin films in which the base layer comprises propylene homopolymers and the heat-sealing layer(s) (outer layer(s) or top layer(s)) comprises heat-sealable olefin polymers are described in numerous publications (for example EP-A-0 194 588, EP-A-0 008 904 and U.S. Pat. No. 4,419,411). The multilayer polyolefin films have important properties for packaging films, such as a large heat-sealing range, good heat-sealability and low haze and high sheen.

The heat-sealable films described are generally produced in such a way that they are as dimensionally stable as possible, i.e. these films have the lowest possible shrinkage in the longitudinal and transverse directions. In general, packaging films of this type exhibit shrinkage values at 120° C. of less than 5% in the longitudinal direction and less than 4% in the transverse direction. The prevailing opinion hitherto was that films having these low shrinkage values give a visually good wrapping appearance. Contrary to this opinion, the packages are wrapped in a loose or bloused manner and have folds and billows at the edges and are therefore unsuitable for products in which particularly tight packaging is required.

In the search for heat-sealable shrink films, it has been found that conventional shrink films are unsuitable for a heat-sealable shrink film. Although coating known highly shrinkable films with a heat-sealable layer enables them to be used in packaging machines, the pronounced shrink properties, which ensure the desired tightness of the packaging, also cause the seal seams to shrink so much that the visual appearance of the packaging is adversely changed. In addition, all conventional, known shrink films are unsatisfactory with respect to their passage through the machine and their antistatic properties.

EP-A-0 489 373 discloses heat-sealable shrink films built up from a polypropylene (PP) homopolymer base layer and ethylene-propylene copolymer outer layers and having high gloss and low haze. These films have increased shrinkage compared with conventional heat-sealable packaging films, but the shrink properties are inadequate if tight coverings are required.

German Patent Application P 41 35 096.0 discloses multilayer polyolefin films comprising a polypropylene base layer and an outer layer made from an HDPE blend. This HDPE blend comprises HDPE and copolymers and/or terpolymers made from $\alpha$-olefins and, if desired, polypropylene. The outer layer of the multilayer film has minimum sheen and maximum haze, giving the film a characteristic matte appearance.

U.S. Pat. No. 4,578,316 discloses a biaxially oriented multilayer polyolefin film whose base layer comprises a polypropylene homopolymer and whose outer layer comprises a blend of polypropylene and MDPE and/or HDPE. This polyolefin film has a low coefficient of friction together with a readily wettable surface. However, this film also has excellent optical transparency.

WO 89/10839 discloses multilayer polyolefin films whose base layer comprises a propylene polymer and whose outer layers comprise either HDPE or an ethylenepropylene copolymer or a polypropylene. The film is stretched under particular temperature conditions. The film has a low coefficient of friction and good wettability, but simultaneously also has high sheen and low haze.

EP-A-0 367 613 discloses a multilayer film comprising a vacuole-containing polypropylene base layer and an inscribable outer layer which contains a first polymer having a melt flow index of $\leq 1$ g/10 min and a second polymer which is incompatible with said first polymer. Incompatible being defined as the second polymer being present as a separate phase. An example given of the first polymer is an HDPE having a density from 0.92 to 0.97 g/cm$^3$. The incompatible polymer is a polypropylene or a copolymer of propylene or a terpolymer of propylene. The film described has an opaque appearance, i.e. it is essentially non-transparent to light. The film described has a density of 0.69 g/cm$^3$. This film cannot be employed for many applications due to its opacity.

SUMMARY OF THE INVENTION

One object of the present invention is to provide a shrinkable, biaxially oriented, heat-sealable, multilayer polyolefin film which has a characteristic matte appearance, good passage through the machine and good antistatic properties and simultaneously forms a tight, effective, billow- and fold-free wrapping and has good to very good shrink properties. The shrink and heat-sealing properties must simultaneously be optimized with respect to a visually perfect seal seam, which must not be impaired by the shrinkage.

Another object of the present invention is to provide a coextrusion process for the production of the multilayer film. Still another object of the present invention is to provide a method for shrink packaging an article with the multilayer film. Yet another object of the present invention is to provide a packaged article shrink wrapped by the multilayer film.

In accomplishing the foregoing objectives, there has been provided according to one aspect of the present invention a heat-sealable, shrinkable multilayer polypropylene film having at least one matte surface which comprises at least one base layer containing polypropylene or a polypropylene mixture and at, least one outer layer which comprises a mixture or a blend of two components I and II.

Component I of the mixture or blend is a copolymer of α-olefins having 2 to 10 carbon atoms or a terpolymer of α-olefins having 2 to 10 carbon atoms or a mixture of two or more of said copolymers and terpolymers or a blend of two or more of said copolymers and terpolymers. Component II of the mixture or blend is a high-density polyethylene (HDPE) or a blend of HDPE and one or more further polymers selected from the group consisting of copolymers of α-olefins having 2 to 10 carbon atoms, terpolymers of α-olefins having 2 to 10 carbon atoms, and blends of copolymers and terpolymers of α-olefins having 2 to 10 carbon atoms. In a preferred embodiment, component I is selected from the group consisting of a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixtures or blends thereof and a blend of two or more of said copolymers and terpolymers, mixed with one or more of said copolymers and terpolymers.

Component II is selected from the group consisting of an HDPE and a blend of two components A and B, where blend component A is preferably an HDPE and blend component B is selected from the group consisting of a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, and mixtures or blends thereof.

The multilayer film has, at 120° C., a longitudinal shrinkage of greater than about 8%, and a transverse shrinkage of greater than 10%. The multilayer film has, at 90° C. a longitudinal shrinkage of at most about 10%, and a transverse shrinkage of at most 10%, preferably from 8 to 2%. The at least one outer layer has a minimum heat-sealing temperature of at most about 124° C.

Preferably, the HDPE has an MFI from about 0.2 to 50 g/10 min, a viscosity index from about 100 to 450 cm$^3$/g, a density from about 0.93 to 0.97 g/cm$^3$, a degree of crystallization from about 35 to 80% and a melting point of about 120° to 150° C.

Another aspect of the present invention provides a process for the production of the multilayer polypropylene film comprising the steps of coextruding the melts corresponding to the individual layers of the film through a flat-film die, taking the coextruded film off over a take-off roll whose temperature is between about 4° and 100° C., biaxially stretching the film at a longitudinal stretching ratio of about 4:1 to 9:1 and a transverse stretching ratio of about 6:1 to 10:1, heat-setting the biaxially stretched film, optionally corona-treating and subsequently winding the film up.

Preferably, the ratio between the transverse stretching ratio $S_t$ and the longitudinal stretching ratio $S_l$, ($S_t$:$S_l$), is less than about 2, preferably from about 0.5 to 1.5.

Still another aspect of the present invention provides a packaged article comprising the multilayer polypropylene film surrounding at least in part an article.

Yet another aspect of the present invention provides a process for packaging an article, comprising the steps of wrapping an article at least in part with the film, followed by shrinking the film around the article.

Further objects, features and advantages of the 10 present invention will become apparent to persons skilled in the art from the detailed description of preferred embodiments that follows.

DETAILED DESCRIPTION OF THE PREFERRED EMBODIMENTS

The present invention comprises a matte multilayer film of the generic type mentioned above, where component I of the outer layer comprises a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said copolymers and terpolymers or a blend of two or more of said copolymers and terpolymers, if desired mixed with one or more of said copolymers and terpolymers.

Component II comprises an HDPE or a blend of two blend components A and B, where blend component A is preferably an HDPE and blend component B is preferably a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said copolymers and terpolymers or a blend of two or more of said copolymers and terpolymers.

The multilayer film:

has at 120° C., a longitudinal shrinkage of greater than 8%, preferably from 10 to 30%, and a transverse shrinkage of greater than 10%, preferably from 10 to 30%; and has at 90° C., a longitudinal shrinkage of at most 10%, preferably from 8 to 2%, and a transverse shrinkage of at most 10%, preferably from 8 to 2%.

The outer layer(s) has/have a minimum heat-sealing temperature of at most 124° C., preferably from 75° to 120° C.

Surprisingly, it has been shown that the film according to the invention having a longitudinal shrinkage of greater than about 10%, preferably from about 10 to 30%, more preferably from about 10 to 20%, at 120° C. and an increased transverse shrinkage of greater than about 10%, preferably from about 10 to 30%, more preferably from about 10 to 25%, at 120° C. gives in spite of its high shrinkage capacity, visually perfect seal seams compared with the known films of the prior art. This is because the shrinkage is rather low in the temperature range of the minimum heat-sealing temperature (compared with the shrinkage behavior at 120° C.). At the same time, they give a significantly tighter, fold- and billow-free wrapping appearance than conventional films due to the isotropic shrink properties and the greatly increased shrinkage at elevated temperature. The uniform shrinkage in the longitudinal and transverse directions, even at elevated temperature (about 120° C.), makes an essential contribution to the uniform wrapping. In general, the ratio between the transverse shrinkage $S_t$ and the longitudinal shrinkage $S_l$ at a particular temperature is at most about 2.5. The ratio $S_t$:$S_l$ is preferably in the range from about 2 to 0.5, more particularly in the range from about 2 to 1. The tight, fold- and billow-free packaging in combination with a visually perfect seal seam and the characteristic matte appearance ensures packaging having a significantly more attractive appearance.

For the purposes of the present invention, mixtures are defined as mechanical mixtures prepared from the individual components. Generally, the individual constituents are combined as small compression moldings, for example, lenticular or spherical granules, and mechanically mixed using a suitable vibrating device.

For the purposes of the present invention, a blend is an alloy-like compound of the individual components which cannot be re-separated into the original constituents. A blend has similar properties to a homogeneous material and can be characterized correspondingly by suitable parameters.

Films according to the invention prepared from a mixture of polymers are characterized by a less homogeneous appearance than films prepared from polymer blends.

The base layer of the multilayer film according to the present invention comprises a homopolymer or copolymers or terpolymers of α-olefins having 2 to 8 carbon atoms, in particular homopolymers, copolymers or terpolymers of propylene or a mixture of said polymers and any additives added. Preferred α-olefinic copolymers or terpolymers are copolymers of ethylene-propylene or propylene-butylene units or terpolymers of propylene. Particular preference is given to ethylene-propylene copolymers having an ethylene content of about 10% by weight or less and ethylene-propylene-butylene terpolymers having an ethylene content from about 1 to 7% by weight and a butylene content from about 4 to 10% by weight and a propylene content from about 83 to 95% by weight. The data in % by weight relate to the particular copolymer or terpolymer. In addition, mixtures of two or more of the above mentioned olefinic polymers are particularly suitable. In particular, mixtures of said propylene copolymers, preferably ethylene-propylene copolymers, with said propylene terpolymers, and mixtures of the above-described propylene copolymers or propylene terpolymers with propylene homopolymers are well suited. Particular preference is given to mixtures of said ethylene-propylene copolymers with ethylene-propylene-butylene terpolymers and of ethylene-propylene copolymers with polypropylene (PP) homopolymers or of ethylenepropylene-butylene terpolymers with PP homopolymers. In the particularly preferred mixtures containing PP homopolymers, said copolymers and/or terpolymers form the principal constituents, comprising at least about 50% by weight, preferably from about 60 to 98% by weight, based on the entire mixture. The PP homopolymer content of the mixtures is correspondingly a maximum of about 50% by weight, preferably in the range from about 2.0 to 40% by weight, in each case based on the entire mixture. For three-component mixtures containing copolymers, terpolymers and homopolymers, the mixing ratios of the copolymers or terpolymers vary within broad limits.

The propylene homopolymer present as a mixture component in the base layer has a melting point of about 140° C. or above, preferably from about 150° to 170° C. Isotactic homopolypropylene having an n-heptane-soluble content of about 6% by weight or less, based on the homopolymer, is particularly preferred. The melt flow index of the PP homopolymer is in the range from about 0.5 to 8 g/10 min, preferably from about 2 to 5 g/10 rain (DIN 53 735).

The copolymers and/or terpolymers in the base layer described above have a melting point in the range of about 100° to 150° C., preferably from about 120° to 135° C., and a melt flow index in the range from about 0.5 to 10 g/10 min, preferably from about 2 to 8 g/10 min (DIN 53 735).

The film according to the invention has an essentially transparent base layer, i.e. one that does not contain vacuoles.

The multilayer film according to the invention contains at least one outer layer set forth above, which comprises a mixture described below in greater detail of two components I and II and whose minimum heat-sealing temperature is low.

It is essential to the invention that the minimum heat-sealing temperature of the outer layer composition is low, particularly below about 124° C. Otherwise, the elevated temperature during the heat-sealing causes significant shrinkage to be initiated at the same time, which results in undesired shrinkage of the seal seam. Preference is given to an outer layer material having a minimum heat-sealing temperature of from 75° to 120° C., more preferably from 80° to 110° C.

Component I of the outer layer mixture or of the blend preferably comprises a copolymer of
 ethylene and propylene or
 ethylene and butylene or
 propylene and butylene or
 ethylene and another α-olefin having 5 to 10 carbon atoms or
 propylene and another α-olefin having 5 to 10 carbon atoms or a terpolymer of
 ethylene and propylene and butylene or
 ethylene and propylene and another α-olefin having 5 to 10 carbon atoms or a mixture of two or more of said copolymers and terpolymers or a blend of two or more of said copolymers and terpolymers, if desired mixed with one or more of said copolymers and terpolymers.

In a preferred embodiment, component I advantageously comprises a copolymer of
ethylene and propylene or
ethylene and 1-butylene or
propylene and 1-butylene or a terpolymer of
ethylene and propylene and 1-butylene or a mixture of two or more of said copolymers and terpolymers or a blend of two or more of said copolymers and terpolymers, if desired mixed with one or more of said copolymers and terpolymers.

Particular preference is given to random ethylene-propylene copolymers having
an ethylene content from about 2 to 10% by weight, preferably from about 5 to 8% by weight, or random propylene-1-butylene copolymers having
a butylene content from about 5 to 40% by weight, preferably from about 20 to 30% by weight,
in each case based on the total weight of the copolymer, or random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
in each case based on the total weight of the terpolymer, or a blend of an ethylene-propylene-1-butylene terpolymer and a propylene-1-butylene copolymer
having an ethylene content from about 0.1 to 7% 10 by weight
and a propylene content from about 50 to 90% by weight
and a 1-butylene content from about 10 to 40% by weight,
in each case based on the total weight of the polymer blend.

Component II of the outer layer mixture preferably comprises an HDPE or a blend essentially comprising HDPE as component A and a component B. For the purposes of the present invention, HDPE is defined as high-pressure polyethylenes which have the following properties:

1. The melt flow index (MFI), measured in accordance with DIN 53 735 or ISO 1133 at 50 N/190° C., is in the range from about 0.2 to 50 g/10 min, preferably from about 1 to 45 g/10 min, more preferably from about 5 to 35 g/10 min.

2. The viscosity index, measured in accordance with DIN 53 728, Part 4, or ISO 1191, is in the range from about 100 to 450 cm$^3$/g, preferably from about 120 to 280 cm$^3$/g.

3. The crystallinity is from about 35 to 80%, preferably from about 50 to 80%.

4. The density, measured at 23° C. in accordance with DIN 53 479, Method A, or ISO 1183, is in the range from about 0.93 to 0.97 g/cm$^3$, preferably from about 0.95 to 0.96 g/cm$^3$.

5. The melting point, measured by differential scanning calorimeter (DSC) (maximum of the melting curve, heating rate 20° C./min) is between about 120° and 150° C., preferably between about 125° and 135° C.

The HDPE as component II and the HDPE as blend component A is selected from the above-described polyethylenes, so that the same HDPE as blend component A is in principle suitable as component II, but they need not be identical.

Blend component B preferably comprises a copolymer of
ethylene and propylene or
ethylene and butylene or
propylene and butylene or
ethylene and another α-olefin having 5 to 10 carbon atoms or
propylene and another α-olefin having 5 to 10 carbon atoms or a terpolymer of
ethylene and propylene and butylene or
ethylene and propylene and another α-olefin having 5 to 10 carbon atoms or a mixture of two or more of said copolymers and terpolymers or a blend of two or more of said copolymers and terpolymers.

In a preferred embodiment, blend component B advantageously comprises a copolymer of
ethylene and propylene or
ethylene and 1-butylene or
propylene and 1-butylene or a terpolymer of
ethylene and propylene and 1-butylene or a mixture of two or more of said copolymers and terpolymers or a blend of two or more of said copolymers and terpolymers.

Particular preference is given to random ethylene-propylene copolymers having
an ethylene content from about 2 to 10% by weight, preferably from about 5 to 8% by weight, or random propylene-1-butylene copolymers having
a butylene content from about 5 to 40% by weight, preferably from about 20 to 30% by weight,
in each case based on the total weight of the copolymer, or random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight,
in each case based on the total weight of the terpolymer, or a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight,
in each case based on the total weight of the polymer blend.

The weight ratio between the two blend components A and B is from about A:B=20:80 to A:B=80:20, preferably from about A:B=40:60 to A:B=60:40, more preferably about A:B=45:55.

The blend of components A and B has a melt flow index (DIN 53 735 at 230° C. and a load of 21.6N) from about 1.5 g/10 min to 12 g/10 min, preferably from about 2.5 g/10 min to 6 g/10 min, the melt flow index of the blend preferably being higher than that of the propylene polymer of the base layer. The melting range of the blend is between about 100° and 160° C. preferably between about 120° and 150° C.

The weight ratio between the two components I and II of the outer layer mixture or of the blend can vary within broad limits and depends on the intended application of the multilayer film. The ratio between components I and II is preferably in a range from about I:II=10:90 to I:II=90:10, preferably between about I:II=30:70 to I:II=70:30, more preferably about I:II=50:50.

If desired, the outer layer composition may contain small amounts of a propylene homopolymer. However, these amounts must be kept so low that the heat-sealability of the outer layer is not impaired. In general, the proportion of homopolymer (if present) is less than about 20% by weight, preferably less than about 10% by weight, more preferably less than about 5% by weight.

The multilayer film according to the invention comprises at least the above-described base layer and at least one above-described matte (first) outer layer. The outer layer has a low minimum heat-sealing temperature, which comprises the above-described mixture or blend. Depending on its intended application, the multilayer film may have a further (second) outer layer on the opposite side, which also advantageously has a low heat-sealing temperature.

The structure, thickness and composition of the second layer can be selected independently of the first matte outer layer, which layer according to the present invention is already present. Preferred embodiments of the multilayer film have three layers. The second outer layer cad comprise one of the above-described mixtures or blends of the present invention, which is not necessarily identical to that of the first outer layer. However, the second outer layer may also comprise any other conventional outer layer polymer.

The thickness of the matte outer layer(s) is greater than about 0.4 μm, preferably in the range from about 0.8 to 4 μm, more preferably from about 1 to 3 μm. The outer layers on both sides can have identical or different thicknesses.

The overall thickness of the multilayer polyolefin film according to the present invention can vary within broad limits and depends on the intended use. It is preferably from about 5 to 70 μm, more preferably from about 10 to 50 μm, with the base layer making up from about 50 to 90% of the overall film thickness.

The density of the film according to the invention is at least about 0.8 g/cm$^3$, preferably in the range from about 0.9 to 0.92 g/cm$^3$.

In order to improve the adhesion properties of the outer layer(s), one surface of the film may be corona- or flame-treated. If desired, the corresponding treatment can be carried out on both surfaces.

In order to further improve specific properties of the polypropylene film according to the present invention, both the base layer and the outer layer(s) may contain further additives in an effective amount. Preferred additives are antiblocking agents and/or stabilizers and/or neutralizers and/or lubricants and/or antistatics which are compatible with the polymers of the base layer and of the outer layer(s), with the exception of antiblocking agents which are generally incompatible. All amount data hereinafter in percent by weight (% by weight) and in each case relate to the layer or layers to which the additive can be added.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from about 0.1 to 2% by weight, preferably from about 0.1 to 0.5% by weight. The mean particle size is between about 1 and 6 μm, in particular about 2 and 5 μm. Particularly suitable are particles having a spherical shape, such as those described in EP-A-0 236 945 and DE-A-38 01 535, the disclosures of which are hereby incorporated by reference. The antiblocking agents are preferably added to the outer layers.

Stabilizers which can be employed are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, preferably from about 0.15 to 0.3% by weight, and have a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4hydroxybenzyl)benzene are particularly advantageous.

Neutralizers are preferably calcium stearate and/or calcium carbonate having a mean particle size of at most about 0.7 μm, an absolute particle size of less than about 10 μm and a specific surface area of at least about 40 m$^2$/g.

Lubricants are higher aliphatic acid amides, higher aliphatic acid esters, waxes and metal soaps and polydimethylsiloxanes. The effective amount of lubricant is in the range from about 0.01 to 3% by weight. Particularly suitable is the addition of higher aliphatic acid amides in the range from about 0.05 to 0.25% by weight in the base layer and/or the outer layers. A particularly suitable aliphatic acid amide is erucamide. The addition of polydimethylsiloxanes is preferably in the range from about 0.1 to 2.0% by weight. Polydimethylsiloxanes having a viscosity from about 10,000 to 1,000,000 mm$^2$/s are especially preferred.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$) alkyl groups. N,N-bis(2-hydroxyethyl)alkylamines having 10 to 20 carbon atoms, preferably 12 to 18 carbon atoms, in the alkyl radical being particularly suitable. The effective amount of antistatic is in the range from about 0.05 to 0.3% by weight. Glycerol monostearate is also preferably employed as an antistatic.

Another aspect of the present invention relates to a process for the production of the multilayer film according to the present invention by the coextrusion process, which is known per se.

This process is carried out by coextruding the melts corresponding to the individual layers of the film through a flat-film die, taking off the resultant film over one or more rolls for solidification, subsequently biaxially stretching (orienting) the film, heat-setting the biaxially stretched film and, if desired, corona- or flame-treating the surface layer intended for treatment.

The biaxial stretching (orientation) can be carried out simultaneously or consecutively. Consecutive biaxial stretching, in which stretching is carried out first longitudinally (i.e., in the machine direction) and then transversely (i.e., perpendicular to the machine direction), is preferred. The stretching conditions are selected so that the film has the most balanced orientation possible, i.e. it has virtually isotropic properties. The temperature during the stretching processes should be selected so that the film has the desired high shrinkage.

As is conventional in coextrusion, the polymer or polymer mixture of the individual layers is compressed and liquified in an extruder, with it being possible for any additives to be already present in the polymer or polymer mixture as added at this time. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. The stretching in the longitudinal direction is preferably from about 4:1 to 9:1 and the stretching in the transverse direction is from about 6:1 to 10:1, preferably 6:1 to 8:1. The longitudinal stretching is expediently carried out with the aid of two rolls running at different speeds corresponding to the desired stretching ratio. The transverse stretching is expediently carried out with the aid of an appropriate tenter frame. The film is expediently not highly stretched transversely. In order to achieve the shrinkage properties which are essential to the present invention, a ratio between the transverse and longitudinal stretching ratios of less than about 2, preferably less than about 1.5, should be maintained. This ratio is most preferably in the range from about 0.5 to 1.5.

Biaxial stretching of the film is followed by heat-setting (heat treatment), the film being kept at a temperature from about 110° to 130° C. for about 0.5 to 10 seconds. The film is subsequently wound up in the conventional manner by means of a wind-up unit.

It has proven particularly advantageous to keep the take-off roll or rolls at a temperature from about 10° to 100° C., preferably from about 20° to 60° C., by means of a heating and cooling circuit. This serves the purpose of cooling and solidifying the extruded film.

In addition, the longitudinal stretching is advantageously carried out at a temperature below about 130° C., preferably in the range from about 80° to 120° C. The transverse stretching is advantageously carried out at a temperature above about 110° C., preferably from about 130° to 155° C.

If desired, one or both surfaces of the film can, as mentioned above, be corona- or flame-treated by one of the known methods after the biaxial stretching. The treatment intensity is generally in the range from about 38 to 42 mN/m.

In the case of corona treatment an advantageous procedure is to pass the film between two conductor elements serving as electrodes. A high voltage, usually alternating voltage (from about 5 to 20 kV and from about 5 to 30 kHz), is applied between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000 V, preferably in the range from about 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer using this procedure is substantially less than in the case of standard flame treatment, and films can be obtained in which the heat-sealing properties of the treated side are even better than those of the untreated side.

The multilayer film according to the present invention is distinguished by a very homogeneous appearance, a characteristic matte sheen and excellent shrinkage properties. In addition, the film has excellent running properties on automatic packaging machines. The film also has very good antistatic properties.

Surprisingly, it has been found that the film according to the invention having the shrinkage characteristics and outer layer composition of the present invention has, in spite of its high shrinkage capacity, visually perfect seal seams. At the same time it has a significantly tighter, fold- and billow-free wrapping appearance than conventional films due to the highly increased shrinkage at elevated temperature. The tight, fold- and billow-free wrapping in combination with visually perfect seal seams and the characteristic matte appearance ensure a significantly more attractive appearance.

In addition to the excellent shrinkage properties, the film is distinguished by a uniform matte appearance. The films according to the invention exhibit the desired 'matte' appearance if the film has the most uniform appearance possible and if the sheen and haze of the films have low and relatively high values respectively (compared with 'transparent' films), but not minimum or maximum values. It has been found that films having sheen values (at a measurement angle of 85°, measured in accordance with ASTM-D-523-78) of less than about 80, preferably less than about 60, and a haze (measured in accordance with ASTM-D-1003) of greater than about 10, preferably greater than about 30, are matte. The respective values for sheen and haze in an embodiment should only vary within relatively narrow limits, i.e. by a maximum of 20%. This requirement is satisfied particularly well if the sheen is in the range from about 25 to 45 (85°, ASTM-D-5237) and the haze is in the range from about 40 to 80, preferably from about 50 to 70, and the variations of sheen and haze over the entire film are less than about 20%, preferably from about 1 to 10%.

In summary, it should be noted that the multilayer film according to the invention is distinguished by a multiplicity of advantageous properties, which make it particularly suitable for its preferred application as a heat-sealable and shrinkable packaging film. The advantageous properties include:

good shrinkage properties, good heat-sealing properties, visually perfect seal seams, a uniform matte appearance, good passage through the machine, and good antistatic properties.

The excellent shrink properties ensure a tight, fold- and billow-free wrapping appearance, but surprisingly, the seal seams are in no way impaired in appearance. At the same time, the film satisfies all other requirements made of packaging materials. The shrink film can be processed well on high-speed packaging machines and has good antistatic properties. It has a particularly uniform matte appearance. In addition, the film can be printed extremely well or metallized or laminated, particularly after corona or flame treatment. The film according to the present invention is thus highly suitable for its intended application as a packaging film, particularly as film packaging for video and audio cassettes, but also for bakery products.

The invention is now described in greater detail with reference to working examples as shown in Table 1 below. In the following examples, $C_2$ is defined as ethylene, $C_3$ is defined as propylene and $C_4$ is defined as butylene.

TABLE 1

| | Component I | Component II | I:II |
|---|---|---|---|
| E1 | $C_2/C_3/C_4$-terpolymer + $C_3/C_4$-copolymer | HDPE + $C_2/C_3$-copolymer | 60:40 |
| E2 | $C_2/C_3/C_4$-terpolymer | HDPE + $C_2/C_3/C_4$-terpolymer + $C_3/C_4$-copolymer | 50:50 |
| E3 | $C_2/C_3/C_4$-terpolymer | HDPE + $C_2/C_3/C_4$-terpolymer | 50:50 |
| E4 | $C_2/C_3/C_4$-terpolymer + $C_3/C_4$-copolymer | HDPE | 50:50 |
| E5 | $C_2/C_3/C_4$-terpolymer | HDPE | 50:50 |
| E6 | $C_2/C_3/C_4$-terpolymer | HDPE | 70:30 |

E = Example

EXAMPLE 1

A three-layer film with a thickness of 1 mm and the layer structure XZX, i.e. the base layer Z was surrounded by two identical outer layers X, was extruded by the coextrusion process from a flat-film die at an extrusion temperature of 260° C.

The base layer essentially comprised a mixture of 89.7% by weight of a random propylene-ethylene copolymer having an ethylene content of 4.5% by weight, a melting point of 134° C., and a melt flow index of 7.0 g/10 min at 230° C. and 21.6N (DIN 53 735) and 10.0% by weight of a propylene homopolymer having an n-heptane-soluble content of 4.5% by weight and a melting point of 165° C. The melt flow index of the propylene homopolymer was 3.2 g/10 min at 230° C. and a load of 21.6N (DIN 53 735).

In addition the base layer contained 0.2% by weight of an N,N-bis(hydroxyethyl)($C_{10}$–$C_{20}$)alkylamine (Armostat® 300) and 0.05% by weight of erucamide.

The two outer layers X essentially comprised a mechanical mixture of components I and II in the ratio of I:II=60:40. Component I comprised a polymer blend of an ethylene-propylene-1-butylene terpolymer and a propylene-1-butylene copolymer corresponding to a content of 0.7% by weight of ethylene, 81.3% by weight of propylene and 18% by weight of butylene, based on the polymer blend.

Component II comprised a blend of two components A and B in the ratio of A:B=50:50. Component A comprised an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C., measured by DSC. Component B comprised a random ethylene-propylene copolymer having an ethylene content of 4.5% by weight, based on the weight of the copolymer. The melting point of the copolymer was 134° C. and the melt flow index was 7.0 g/10 min.

The mixing ratio of the two components I and II was I:II=60:40. Components I and II were mixed mechanically in a Henschel mixer for 2 minutes at 500 rpm, in the ratio of I:II=60:40 giving a homogeneous granule mixture.

All layers contained 0.12% by weight of pentaerythrityl tetrakis[4-(3,5-di-tert-butyl-4-hydroxyphenyl)propionate (Irganox® 1010) as stabilizer and 0.06% by weight of calcium stearate as neutralizer.

After coextrusion, the extruded three-layer film was taken off over the corresponding process steps via a take-off roll and cooled. The film was subsequently stretched longitudinally and stretched transversely. After stretching, the film was set and corona-treated. The following conditions in detail, were selected:

Extrusion:
  Extrusion temperature 230° C.
  First take-off roll temperature 30° C.
Longitudinal stretching:
  Stretching roll T=100° C.
  Longitudinal stretching by a factor of 6.5
Transverse stretching:
  Heat-up zones T=145° C.
  Stretching zones T=140° C.
  Transverse stretching by a factor of 7.3
Setting:
  Temperature T=40 ° C.
Corona treatment:
  Voltage: 10,000 V
  Frequency: 10,000 Hz The multilayer film produced in this way had a matte surface on both sides and had a surface tension of from 40 to 41 mN/m, directly after production.

The film had a thickness of about 210 μm, with the base layer having a thickness of 19 μm and each outer layer having a thickness of 1.25 μm.

EXAMPLE 2

Example 1 was repeated with the following changes. Component I comprised a terpolymer of ethylene, propylene and 1-butylene units, having an ethylene content of 1.9% by weight and a 1-butylene content of 8.4% by weight, based on the terpolymer.

Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C., measured by DSC. Component B comprised a polymer blend of an ethylenepropylene-1-butylene terpolymer and a propylene- 1-butylene copolymer, corresponding to a content of 0.7% by weight of ethylene, 81.3% by weight of propylene and 18% by weight of butylene, based on the polymer blend.

The mixing ratio of the two components I and II was 50:50.

EXAMPLE 3

Example 1 was repeated with the following changes.

Component I comprised a terpolymer of ethylene, propylene and 1-butylene units, having an ethylene content of 1.9% by weight and a 1-butylene content of 8.4% by weight, based on the terpolymer.

Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C., measured by DSC. Component B comprised a terpolymer of ethylene, propylene and 1-butylene units, having an ethylene content of 1.9% by weight and a 1-butylene content of 8.4% by weight, based on the terpolymer. The mixing ratio of the two components I and II was 50:50.

EXAMPLE 4

Example 1 was repeated with the following changes. Component II comprised pure HDPE having an MFI (50 N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C., measured by DSC. The mixing ratio of the two components I and II was 50:50.

EXAMPLE 5

Example 4 was repeated with the following changes. Component I corresponded to that of Example 2. The mixing ratio of the two components I and II was 50:50.

EXAMPLE 6

Example 5 was repeated with the following changes. The mixing ratio of the two components I and II was 70:30.

The raw materials and films were characterized using the following measurement methods:
Melt flow index The melt flow index was measured in accordance with DIN 53 735 at a load of 21.6N and 230° C. or at a load of 50N and 190° C.
Melting point DSC measurement, maximum of the melting curve, heating rate 20° C./min.
Viscosity index J The viscosity index is a measure of the molecular weight. The viscosity index is measured in accordance with DIN 53 728, Part 4, in 0.1% strength decahydronaphthalene solution at 135° C.
Density ρ

The density is determined in accordance with DIN 53 479, Method A.
Degree of crystallization α

The degree of crystallization can be determined from the following equation:

$$\alpha = \frac{\rho - \rho_{amorphous}}{\rho_{crystalline} - \rho_{amorphous}} \cdot 100\%$$

where $\rho_{amorphous}$=0.8549 g/cm³
$\rho_{crystalline}$= 1.0005 g/cm³
ρ=density of the HDPE grade employed Haze The haze of the film was measured in accordance with ASTM-D-1003-52.
Sheen The sheen was determined in accordance with DIN 67 530. The reflection value was measured as an optical parameter for the surface of a film. In accordance with the standards ASTM-D-523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.
Seal seam strength For the determination, two film strips 15 mm in width were laid one on top of the other and sealed together at 130° C. for 0.5 seconds under a pressure of 10 mm² (instrument used: Brugger NDS, with sealing jaws heated on one side). The seal seam strength was determined by the T-peel method.
Determination of the minimum heat-sealing temperature Heat-sealed samples (seal seam 20 mm×100 mm) are produced using the Brugger HSG/ET sealing unit by sealing a film at different temperatures with the aid of two heated sealing jaws at a pressure of 10N/cm² for 0.5 second. Test strips with a width of 15 mm are cut out of the sealed samples. The T-seam strength, i.e. the force necessary to separate the test strips, is determined using a tensile tester at a peel rate of 200 mm/min, the seal seam plane forming a right angle to the tension direction. The minimum heat-sealing temperature is the temperature at which a seal seam strength of at least 0.5N/15 mm is achieved.
Scratch resistance or scratch sensitivity The scratch resistance is determined in accordance with DIN 53 754.

The scratch resistance was determined using a Taber model 503 abraser A from Teledyne Taber, with Calibrade R H18 abrasive wheels loaded with 250 g. Scratch resistance or scratch sensitivity was taken to mean the increase in haze of the scratched film compared to the original film after 50 revolutions of the sample wheel. The scratch resistance is very good (++) if the increase in haze is less than 22%, good (+) if the increase in haze is from 22 to 25%, moderate (±) if the increase in haze is 25 to 30%, and poor (−) if the increase in haze is greater than 30%.
Roughness The roughness was determined in accordance with DIN 4768.
Friction The friction was determined in accordance with DIN 53 375.
Surface tension The surface tension was determined by the ink method (DIN 53 364).
Printability The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removable, it was assessed as being poor.

Shrinkage

The longitudinal and transverse shrinkage values are based on the respective increase in length of the film (longitudinally $L_0$ and transversely $T_0$) before the shrinking process. The longitudinal direction is the machine direction, and the transverse direction is accordingly defined as a direction perpendicular to the machine direction. The test sample is shrunk in a fan-assisted oven at the respective temperature (90° or 120° C.) for a period of 15 minutes. The permanent elongations of the sample in the longitudinal and transverse directions is then redetermined ($L_1$ and $T_1$). The shrinkage is then given as the difference between the elongations determined compared with the original lengths $L_0$ and $T_0$.

$$\text{Longitudinal shrinkage} \quad S_L = \frac{L_0 - L_1}{L_0}$$

$$\text{Transverse shrinkage} \quad S_t = \frac{T_0 - T_1}{T_0}$$

This determination method for the longitudinal and transverse shrinkage corresponds to DIN 404 34.

Passage through machine

The smoothness of the passage through the wrapping machine was determined visually and was assessed as follows:

| | | |
|---|---|---|
| very good (++) | <2% | of the sample packs are faultily wrapped |
| good (+) | 2–6% | of the sample packs are faultily wrapped |
| moderate (+–) | 6–12% | of the sample packs are faultily wrapped |
| poor (–) | 12% or more | of the sample packs are faultily wrapped. |

Wrap appearance

The wrap appearance and the optical quality of the seal seams were assessed visually.

Table 2 below shows the properties of the polypropylene films of the examples.

TABLE 2

| Ex. | Sheen (ASTM D-523-78) Measurement angle 85° | Haze (ASTM 1003) % | Roughness (c.o. 0.25 mm) μm | Coefficient of friction – | Surface tension after storage for 6 months mN/m | Visual assessment of the matte appearance (++ = very good) | Minimum heat sealing temperature | Shrinkage (%) 90° C. l | 90° C. t | 120° C. l | 120° C. t |
|---|---|---|---|---|---|---|---|---|---|---|---|
| E1 | 38 | 62 | 2.6 | 0.4 | 39 | ++ | 105° C. | 4 | 3 | 13 | 18 |
| E2 | 36 | 62 | 2.6 | 0.4 | 39 | ++ | 110° C. | 4 | 3 | 11 | 16 |
| E3 | 35 | 62 | 2.6 | 0.4 | 39 | ++ | 115° C. | 6 | 5 | 13 | 20 |
| E4 | 31 | 68 | 3.0 | 0.4 | 38 | ++ | 106° C. | 5 | 4 | 14 | 18 |
| E5 | 30 | 68 | 3.0 | 0.3 | 39 | ++ | 112° C. | 6 | 5 | 12 | 17 |
| E6 | 34 | 64 | 2.8 | 0.4 | 39 | ++ | 115° C. | 5 | 4 | 11 | 18 |

E = example
l = longitudinal shrinkage
t = transverse shrinkage

What is claimed is:

1. A heat-sealable, shrinkable multilayer polypropylene film having at least one matte surface, comprising: at least one base layer which comprises a propylene polymer or a propylene polymer mixture; and at least one outer layer which comprises a mixture or a blend of two components I and II, wherein component I is selected from the group consisting of
- a copolymer of ethylene and propylene,
- a copolymer of ethylene and butylene,
- a copolymer of propylene and butylene,
- a copolymer of ethylene and another α-olefin having 5 to 10 carbon atoms,
- a copolymer of propylene and another α-olefin having 5 to 10 carbon atoms,
- a terpolymer of ethylene and propylene and butylene,
- a terpolymer of ethylene and propylene and another α-olefin having 5 to 10 carbon atoms,
- mixtures or blends thereof and
- a blend of two or more of said copolymers and terpolymers, mixed with one or more of said copolymers and terpolymers, and component II is selected from the group consisting of an HDPE and a blend of two components A and B, where blend component A is essentially an HDPE and blend component B is selected from the group consisting of
- a copolymer of ethylene and propylene,
- a copolymer of ethylene and butylene,
- a copolymer of propylene and butylene,
- a copolymer of ethylene and another α-olefin having 5 to 10 carbon atoms,
- a copolymer of propylene and another α-olefin having 5 to 10 carbon atoms,
- a terpolymer of ethylene and propylene and butylene,
- a terpolymer of ethylene and propylene and another α-olefin having 5 to 10 carbon atoms, and
- mixtures or blends thereof and wherein the multilayer film has, at 120° C., a longitudinal shrinkage of greater than about 8%, and a transverse shrinkage of greater than 10%, the multilayer film has, at 90° C. a longitudinal shrinkage of less than or equal to about 10%, and a transverse shrinkage of less than or equal to 10%, and the at least one outer layer has a minimum heat-sealing temperature of less than or equal to about 124° C.

2. A multilayer polypropylene film as claimed in claim 1, wherein component I is selected from the group consisting of
a copolymer of ethylene and propylene,
a copolymer of ethylene and 1-butylene,
a copolymer of propylene and 1-butylene,
a terpolymer of ethylene and propylene and 1-butylene,
mixtures of blends thereof and
a blend of two or more of said copolymers and terpolymers, if desired mixed with one or more of said copolymers and terpolymers, and blend component B is selected from the group consisting of
a copolymer of ethylene and propylene,
a copolymer of ethylene and 1-butylene,
a copolymer of propylene and 1-butylene,
a terpolymer of ethylene and propylene and 1-butylene,
and
mixtures or blends thereof.

3. A multilayer film as claimed in claim 2, wherein component I is selected from the group consisting of
random ethylene-propylene copolymers having
an ethylene content from about 2 to 10% by weight,
random propylene-1-butylene copolymers having
a butylene content from about 5 to 40% by weight,
in each case based on the total weight of the copolymer,
random ethylene-propylene-1-butylene terpolymers having
an ethylene content from about 1 to 10% by weight, and
a 1-butylene content from about 3 to 20% by weight,
in each case based on the total weight of the terpolymer,
and
a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content of from about 10 to 40% by weight,
in each case based on the total weight of the polymer blend, and blend component B is selected from the group consisting of,
random ethylene-propylene copolymers having
an ethylene content from about 2 to 10% by weight,
random propylene-1-butylene copolymers having
a butylene content from about 5 to 40% by weight,
in each case based on the total weight of the copolymer,
random ethylene-propylene-1-butylene terpolymers having
an ethylene content from about 1 to 10% by weight,
a 1-butylene content from about 3 to 20% by weight,
in each case based on the total weight of the terpolymer,
and
a blend of an ethylene-propylene-1-butylene terpolymer and a propylene-1-butylene copolymer having an ethylene content from about 0.1 to 7% by weight
and a propylene content from about 50 to 90% by weight
and a 1-butylene content from about 10 to 40% by weight,
in each case based on the total weight of the polymer blend.

4. A multilayer polypropylene film as claimed in claim 1, wherein the HDPE has an MFI from about 0.2 to 50 g/10 min a viscosity index from about 100 to 450 cm$^3$/g a density from about 0.93 to 0.97 g/cm$^3$, a degree of crystallization from about 35 to 80% and a melting point of about 120° to 150° C.

5. A multilayer polypropylene film as claimed in claim 1, wherein the ratio between blend components A and B is in the range from about A:B=20:80 to A:B=80:20.

6. A multilayer polypropylene film as claimed in claim 5, wherein the ratio between blend components A and B is in the range from about A:B=40:60 to A:B=60:40.

7. A multilayer polypropylene film as claimed in claim 1, wherein the blend of components A and B has a melt flow index from about 1.5 to 12 g/10 min.

8. A multilayer polypropylene film as claimed in claim 7, wherein the blend of components A and B has an MFI from about 2.5 to 6g/10 min.

9. A multilayer polypropylene film as claimed in claim 1, wherein the ratio between components I and II is in the range from about I:II=90:10 to I:II=10:90.

10. A multilayer polypropylene film as claimed in claim 1, wherein the propylene polymer of the base layer is selected from the group consisting of a propylene copolymer and a propylene terpolymer.

11. A packaged article comprising the multilayer polypropylene film as claimed in claim 1, surrounding at least in part an article.

12. A heat-sealable, shrinkable multilayer polypropylene film having at least one matte surface, comprising: at least one base layer which comprises a propylene polymer or a propylene polymer mixture; and at least one outer layer which comprises a mixture or a blend of two components I and II, wherein component I is selected from the group consisting of
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms,
mixtures or blends thereof and
a blend of two or more of said copolymers and terpolymers, mixed with one or more of said copolymers and terpolymers,
and component II is selected from the group consisting of an HDPE and a blend of two components A and B, where blend component A is essentially an HDPE and blend component B is selected from the group consisting of
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms, and
mixtures or blends thereof and wherein
- the multilayer film has, at 120° C., a longitudinal shrinkage of greater than about 8%, and a transverse shrinkage of greater than 10%,
- the multilayer film has, at 90° C., a longitudinal shrinkage of less than or equal to about 10%, and a transverse shrinkage of less than or equal to 10%, and
- the at least one outer layer has a minimum heat-sealing temperature of less than or equal to about 124° C., and wherein said multilayer film is produced by a process comprising the steps of:

coextruding the melts corresponding to the individual layers of the film through a flat-film die, taking the coextruded film off over a take-off roll whose temperature is between about 40 and 100° C., biaxially stretching the film at a longitudinal stretching ratio of about 4:1 to 9:1 and a transverse stretching ratio of about 6:1 to 10:1, heat-setting the biaxially stretched film and subsequently winding the film up.

13. A multilayer polypropylene film as claimed in claim 12, further comprising the step of corona-treating the heat-set film.

14. A multilayer polypropylene film as claimed in claim 12, wherein the longitudinal stretching of the film is carried out at about 80° to 120° C. and the transverse stretching is carried out at about 130° to 155° C.

15. A multilayer polypropylene film as claimed in claim 12, wherein the ratio between the transverse stretching ratio $S_t$ and the longitudinal stretching ratio $S_l$, $(S_t:S_l)$, is less than about 2.

16. A multilayer polypropylene film as claimed in claim 12, wherein the ratio between the transverse stretching ratio $S_t$ and the longitudinal stretching ratio $S_l$ is between about 0.5 to 1.5.

* * * * *